United States Patent
Katar et al.

(10) Patent No.: US 8,571,041 B2
(45) Date of Patent: Oct. 29, 2013

(54) MANAGING TRANSMISSIONS AMONG NODES COMMUNICATING OVER A SHARED COMMUNICATION MEDIUM

(75) Inventors: Srinivas Katar, Gainesville, FL (US); Sidney Brower Schrum, Jr., Ocala, FL (US); Lawrence W. Yonge, III, Ocala, FL (US); Manjunath Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 12/752,508

(22) Filed: Apr. 1, 2010

(65) Prior Publication Data

US 2010/0254392 A1    Oct. 7, 2010

Related U.S. Application Data

(60) Provisional application No. 61/165,879, filed on Apr. 1, 2009.

(51) Int. Cl.
*H04L 12/28*    (2006.01)

(52) U.S. Cl.
USPC ............ 370/400; 370/321; 370/376; 370/459

(58) Field of Classification Search
USPC .................... 370/229, 400, 321, 376, 459
See application file for complete search history.

(56) References Cited

U.S. PATENT DOCUMENTS

| | | | |
|---|---|---|---|
| 4,225,967 A | 9/1980 | Miwa et al. | |
| 4,622,550 A | 11/1986 | O'Connor et al. | |
| 5,036,518 A | 7/1991 | Tseung | |
| 6,128,283 A | 10/2000 | Sabaa et al. | |
| 6,247,059 B1 | 6/2001 | Johnson et al. | |
| 6,505,253 B1 * | 1/2003 | Chiu et al. | 709/235 |
| 6,940,824 B2 * | 9/2005 | Shibutani | 370/252 |
| 6,990,098 B1 | 1/2006 | Eberle et al. | |
| 7,149,192 B2 | 12/2006 | Kwak | |
| 7,388,853 B2 * | 6/2008 | Ptasinski et al. | 370/338 |

(Continued)

FOREIGN PATENT DOCUMENTS

| | | |
|---|---|---|
| GB | 0012410.7 | 5/2000 |
| WO | WO 01/56251 | 8/2001 |
| WO | WO 01/91384 | 11/2001 |

OTHER PUBLICATIONS

International Search Report and Written Opinion issued in PCT application No. PCT/US2010/029601, mailed Jun. 1, 2010, 9 pages.

*Primary Examiner* — Hassan Kizou
*Assistant Examiner* — Emmanuel Maglo
(74) *Attorney, Agent, or Firm* — DeLizio Gilliam, PLLC (57) ABSTRACT

A method is provided for managing transmissions among nodes communicating over a shared communication medium. The method includes: transmitting a frame from a sender node to a plurality of receiver nodes, the frame including at least a portion of a data packet and control information associated with accessing the communication medium; transmitting over the communication medium information indicating an end of a time window allocated for transmission of acknowledgement signals to the sender node from at least some of the plurality of receiver nodes; assigning each of a plurality of time slots in the time window to different subsets of the plurality of receiver nodes; and for a given receiver node, transmitting an acknowledgement signal from the given receiver node to the sender node during a time slot assigned to the given receiver node, the acknowledgement signal responsive to at least the frame.

45 Claims, 6 Drawing Sheets

(56) References Cited

U.S. PATENT DOCUMENTS

| | | |
|---|---|---|
| 7,400,587 B2 * | 7/2008 | Sinha .............................. 370/241 |
| 7,447,148 B2 | 11/2008 | Gao et al. |
| 7,468,954 B2 | 12/2008 | Sherman |
| 7,606,258 B1 * | 10/2009 | Lin et al. ........................ 370/447 |
| 7,787,495 B2 * | 8/2010 | Laroia et al. .................. 370/474 |
| 2001/0055356 A1 | 12/2001 | Davies |
| 2003/0041146 A1 * | 2/2003 | Davis et al. .................... 709/227 |
| 2003/0120802 A1 | 6/2003 | Kohno |
| 2005/0182842 A1 | 8/2005 | Walsh et al. |
| 2007/0133448 A1 * | 6/2007 | Gao et al. ....................... 370/311 |
| 2008/0037517 A1 * | 2/2008 | Emborg ......................... 370/352 |
| 2009/0109971 A1 | 4/2009 | Rozen et al. |
| 2009/0279470 A1 * | 11/2009 | Seok .............................. 370/312 |
| 2012/0106427 A1 * | 5/2012 | Nakae et al. ................... 370/312 |

\* cited by examiner

MANAGING TRANSMISSIONS AMONG NODES COMMUNICATING OVER A SHARED COMMUNICATION MEDIUM

CROSS REFERENCE TO RELATED APPLICATION

This application claims the benefit of U.S. Provisional Application Ser. No. 61/165,879, filed on Apr. 1, 2009, the entire content of which is incorporated herein by reference.

TECHNICAL FIELD

This description relates to managing transmissions among nodes communicating over a shared communication medium (e.g., managing acknowledgements for multicast transmissions).

BACKGROUND

Some shared medium networks in which multiple nodes share a communication medium, such as wired and wireless Local Area Networks (LANs), have common functional characteristics. For example, different LANs may utilize similar or the same underlying mechanisms in the protocols that govern network operation. The nodes may be implemented as communication stations that are, for example, stand-alone devices or modules within devices, and those stations may function according to protocols from one or more layers of a protocol stack that provide access to the shared communication medium. On networks that experience non-negligible packet error rates, data that is to be delivered reliably to multiple target receiver stations may need to be transmitted unicast, with a separate transmission for each intended receiver station. This can in some cases require a large amount of bandwidth on the medium, depending on the number of intended receiver stations.

SUMMARY

In one aspect, in general, a method is provided for managing transmissions among nodes communicating over a shared communication medium. The method includes: transmitting a frame from a sender node to a plurality of receiver nodes, the frame including at least a portion of a data packet and control information associated with accessing the communication medium; transmitting over the communication medium information indicating an end of a time window allocated for transmission of acknowledgement signals to the sender node from at least some of the plurality of receiver nodes; assigning each of a plurality of time slots in the time window to different subsets of the plurality of receiver nodes; and for a given receiver node, transmitting an acknowledgement signal from the given receiver node to the sender node during a time slot assigned to the given receiver node, the acknowledgement signal responsive to at least the frame.

Aspects can include one or more of the following features.

The acknowledgement signal comprises one of a positive acknowledgement responsive to successfully receiving the portion of the data packet and a negative acknowledgement responsive to not successfully receiving at least a part of the portion of the data packet.

The negative acknowledgement is transmitted responsive to successfully receiving at least part of the frame and not successfully receiving at least part of the portion of the data packet.

At least one of the positive acknowledgement and the negative acknowledgement from the given receiver node consists essentially of remaining idle during a time slot assigned to the given receiver node.

The acknowledgement signal comprises a preamble used for detecting a start of signals over the communication medium and control information.

The control information indicates whether the acknowledgement signal corresponds to a positive acknowledgement or a negative acknowledgement.

The control information includes one or more of: information indicating a number of frames that will precede the time window, information indicating the end of the time window, and information indicating that at least one of the receiver nodes is not to transmit an acknowledgement signal to the sender node after receiving the frame.

The control information includes the information indicating the end of the time window, and the information indicating the end of the time window comprises a time duration relative to a predetermined portion of the frame.

One or more nodes coupled to the communication medium other than the sender node or receiver nodes determine the end of the time window based at least in part on the time duration and transmit a frame after the determined end of the time window.

One or more nodes contend for use of the communication medium after the determined end of the time window and before transmitting the frame.

The control information includes the information indicating that at least one of the receiver nodes is not to transmit an acknowledgement signal, and a time slot previously assigned to a receiver node that is not to transmit an acknowledgement signal is removed from the time window.

The control information includes the information indicating that at least one of the receiver nodes is not to transmit an acknowledgement signal, and the information indicating that at least one of the receiver nodes is not to transmit an acknowledgement signal includes a bit vector, with each bit in the bit vector associated with a single receiver node and indicating if the receiver node is to transmit an acknowledgement signal to the sender node during a time slot previously assigned to the receiver node.

The control information includes the information indicating that at least one of the receiver nodes is not to transmit an acknowledgement signal, and the information indicating that at least one of the receiver nodes is not to transmit an acknowledgement signal includes a field indicating whether a designated set of one or more receiver nodes are to transmit acknowledgement signals during time slots previously assigned to the receiver nodes.

The control information includes the information indicating that at least one of the receiver nodes is not to transmit an acknowledgement signal, and the information indicating that at least one of the receiver nodes is not to transmit an acknowledgement signal includes a field indicating that a receiver with a slot assignment in an indicated range is not to transmit an acknowledgement signal.

At least a portion of the information indicating the end of the time window is included in the control information of the frame and at least a portion of the information indicating the end of the time window is distributed prior to transmission of the frame.

The portion of the information indicating the end of the time window included in the control information of the frame comprises a number of time slots in the time window, and the portion of the information indicating the end of the time window distributed to the receiver nodes prior to transmission of the frame comprises a length of the time slots.

The assigning is performed by the sender node.

The assigning includes one of: transmitting one or more management messages from the sender node to the plurality of receiver nodes, and transmitting assignments of the time slots in the control information.

The assigning is performed prior to transmission of the frame.

A time window allocated for transmission of acknowledgement signals follows the transmission of each of multiple consecutive frames from the sender node.

The time window allocated for transmission of acknowledgement signals follows the transmission of a designated frame from the sender node and the plurality of receiver nodes selectively acknowledge selected portions of data packets included in at least one of the designated frame and one or more preceding frames transmitted from the sender node.

The designated frame includes a preamble and control information and no packet data and is transmitted from the sender node after the frame including the portion of the data packet and the control information associated with accessing the communication medium.

The method further comprises, prior to transmission of the designated frame, determining transmission parameters for the designated frame based on channel characteristics of channels from the sender node to each of a plurality of the receiver nodes.

Determining the transmission parameters based on the channel characteristics includes estimating signal-to-noise ratios associated with each of multiple channels to different receiver nodes and for a given carrier frequency selecting a transmission parameter compatible with a channel associated with the lowest signal-to-noise ratio.

The end of the time window is indicated based at least in part on information in a header of a frame carrying the information indicating the end of the time window.

The method further comprises detecting one or more receiver nodes that are no longer sharing the communication medium.

The method further comprises detecting, by the sender node, that a channel from the sender node to one or more of the receiver nodes has changed and adjusting one or more transmission parameters of subsequent frames from the sender node to the receiver nodes to account for changes in the channel.

One or more of the plurality of receiver nodes are not included in any of the different subsets and are not assigned a time slot for transmission of an acknowledgement signal to the sender node.

In another aspect, in general, a system includes a sender node, communicating with at least some of a plurality of receiver nodes in a network. The sender node is configured to: transmit a frame including at least a portion of a data packet and control information associated with accessing the communication medium, transmit information indicating an end of a time window allocated for transmission of acknowledgement signals to the sender node from at least some of the plurality of receiver nodes. The system includes a receiver node, in the plurality of receiver nodes, configured to: transmit an acknowledgement signal to the sender node during a time slot assigned to the given receiver node, the acknowledgement signal responsive to at least the frame.

Among the many advantages of the invention (some of which may be achieved only in some of its various aspects and implementations) are the following.

Broadcast and multicast messages can be simultaneously sent from one station (the "sender" station) to multiple stations in the network and for acknowledgements can be collected from some or all of the intended recipients (the "receiver" stations). Multicast or broadcast frames can be sent over commercially available LAN systems with no acknowledgement, or with a partial acknowledgement scheme in which only intended receivers may respond with an acknowledgement.

Other aspects and advantages will be apparent from the detailed description, drawings, appendices and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

A slotted immediate response acknowledgement scheme provides reliable delivery of multicast and broadcast messages in shared medium networks (e.g., Local Area Networks or other networks in which multiple stations capable of transmitting share a common communication medium). The scheme allows broadcast and multicast messages to be simultaneously sent from one station (the "sender" station) to multiple stations in the network and for acknowledgements to be collected from some or all of the intended recipients (the "receiver" stations).

Figure 1:
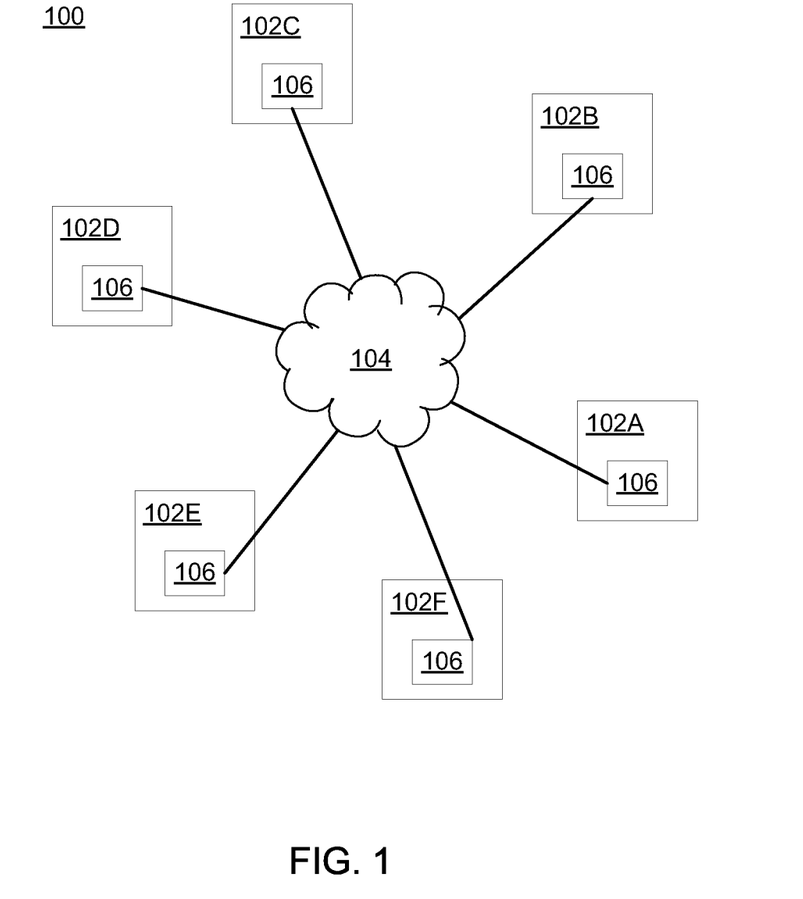
FIG. 1 is a schematic diagram of a communication network.

FIG. 1 shows an example of a communication system 100, which includes stations 102A-102F each coupled to a shared communication medium 104 (which can include any of a variety of different types of physical transmission media or combination of multiple coupled media) over which signals from a transmitting station may propagate to another station coupled to the communication medium. The stations include a network interface module 106 that couples the station to the communication medium 104. A sender station 102A transmits a frame over the medium 104. A portion of the frame may be demodulated and decoded by all nodes on the network, such as header also called a "frame control" field. But, a payload carrying a data packet or portion of a data packet can be included in the frame that only the intended recipients are able to demodulate, which are in this example the "receiver stations" 102C, 102D, and 102E. The receiver stations may interpret the information in the header of the frame to determine whether they are still an intended recipient and/or whether they are to respond to the sender with an acknowledgement signal in their assigned slot, as described in more detail below.

Any of a variety of communication system architectures can be used to implement the portion of the network interface module that converts data to and from a signal waveform that is transmitted over the communication medium. An application running on a station provides and receives data to and from the network interface module in segments called frames generated by a Medium Access Control (MAC) sub-layer. A frame can encapsulate data from a higher layer, such as a data packet or a portion of a data packet, by including the higher layer data as a payload and adding control information such as a header and/or trailer (e.g., a trailing redundancy code). In some cases, a frame may be sent without encapsulating higher layer data as a payload.

A frame may have different names as it is encapsulated by the MAC layer and transferred to a physical (PHY) layer for transmission over the communication medium. A "MAC Service Data Unit" (MSDU) is a segment of information received by the MAC layer. The MAC layer can process the received MSDUs and prepares them to generate "MAC protocol data units" (MPDUs). An MPDU is a segment of information including a header field (e.g., with management and control information) and (optionally) a payload field that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including medium access control, providing the required quality of service (QoS) for the MSDUs, retransmission of corrupt information, routing and repeating. Medium access control enables stations to share the communication medium by specifying when a station is allowed to transmit. Several types of medium access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanisms can also be used.

The Physical layer can also use a variety of techniques to enable reliable and efficient transmission over the transmission medium (power line, coax, twisted pair etc). Various modulation techniques like Orthogonal Frequency Division Multiplexing (OFDM) or Wavelet modulations can be used. Forward error correction (FEC) code like Viterbi codes, Reed-Solomon codes, concatenated codes, turbo codes, low density parity check codes, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

The communication channel from one transmitter to a receiver may not be the same as the channel from another transmitter to that receiver, from that transmitter to another receiver, or the reverse channel from that receiver back to that transmitter. Channel characteristics concern how the transmitted signal is distorted, attenuated, and interfered with between the transmitter and the receiver, and may change over time. The transmitter and receiver may adjust modulation, FEC, etc. to maximize the efficiency in use of the medium. For multicast transmissions, this involves maximizing the successful delivery rate of data to all receivers in the multicast group.

Figure 2:
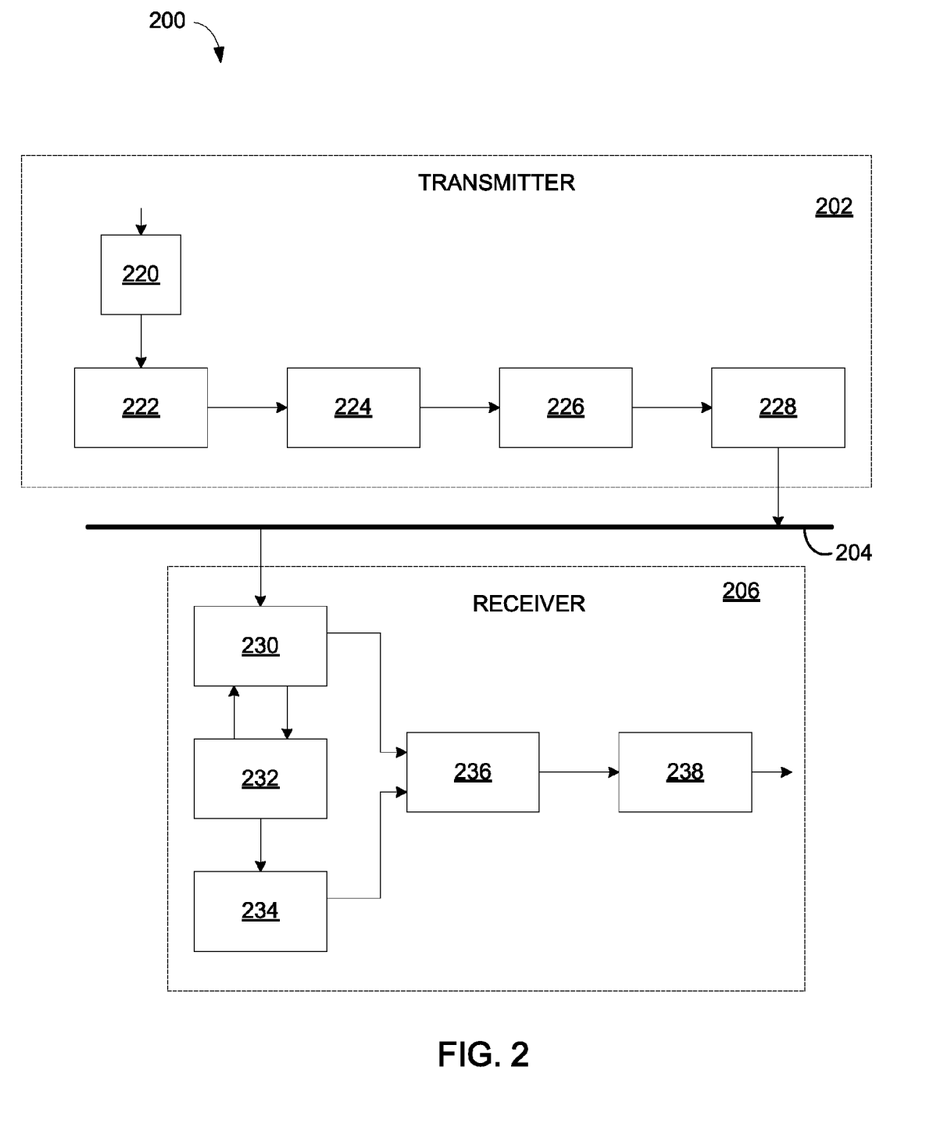
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can provide different respective communication channels corresponding to a path from one station to another over the network.

At the transmitter 202, modules implementing the PHY layer receive an MPDU from the MAC layer. The MPDU is sent to an encoder module 220 to perform processing such as scrambling, error correction coding, and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, Ai is the amplitude and $\Phi_i$ is the phase of the carrier with peak frequency $f_i=(i/N) f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

In one implementation of the system 100, a slotted immediate acknowledgement scheme may improve the reliability of delivery of multicast and broadcast transmissions by providing from each intended recipient (the receiver nodes) to the transmitter (the sender node) an indication of whether transmissions were successfully decoded by the intended recipients. Such indication allows the transmitter to selectively re-transmit data not successfully decoded. The transmitter may re-transmit data multiple times, until all intended recipients have successfully received and decoded the data. In some implementations, the acknowledgement scheme can be used for delivering a digitally encoded video stream over a local area network (LAN) in which there are a limited number of stations to receive the digital video. Generally, the acknowledgement scheme is useful for insuring reliable delivery of multicast or broadcast messages over a shared medium network.

In some implementations, multiple member stations that are members of a common network share a single communications medium (which may include one or more different types of coupled physical transmission media, such as different types of cables or wiring) over which signals can be communicated. The Medium Access Control (MAC) sub-layer, the lower sub-layer of the Link Layer in the OSI reference model, performs the medium access protocols necessary to successfully share the medium. Each member station follows a set of rules and associated behaviors which collectively allow stations in turn to obtain access to the medium and transmit messages to one or more other stations in the network.

Network access protocols can be classified as "contention based" and "contention-free." In some implementations, contention based access protocols utilize "listen before talk" Carrier Sense Multiple Access (CSMA) with collision detection (CD) or collision avoidance (CA) medium access protocols. In some systems using these protocols, stations with messages to transmit listen to the network to ensure it is idle (for example, no other station is transmitting) before transmitting the messages. If two or more stations transmit at the same time the transmissions typically fail. In such cases, the transmitters may detect the failure, and, after waiting for some random period of time, contend for the network again in order to re-transmit the failed transmissions.

In some implementations, contention free access can occur when time periods are reserved on the network during which only one station is permitted to transmit at a time. An example of such a contention free access is Time Division Multiple Access (TDMA). However, contention free access can also occur immediately after a station has successfully contended for access to the network. After winning contention and successfully transmitting a first frame, it may be possible for frames transmitted immediately after the first frame to be sent without contention according to some medium access rules which allow the transmitter to maintain exclusive access to the medium.

Many shared network systems support both contention based and contention-free access protocols. In such systems, due to the distributed nature of a multi-access system, medium access protocols are carefully designed in order to ensure that the network is well-behaved.

In some Implementations, addressing of messages is used in order to identify which station or stations are the intended recipients. For example, messages may be sent with a header which contains a destination address that identifies the stations on the network that are the intended recipients. A unicast destination address identifies a single specific recipient station. A multicast destination address identifies a group of intended recipient stations, while a broadcast address identifies all stations in the network as intended recipients.

In some implementations, acknowledgement messages from receivers to senders are used to ensure reliability of a network. Some shared networks utilize MAC layer acknowledgements called "immediate acknowledgements." Immediate acknowledgements are acknowledgement signals sent within a window that starts immediately after and in response to receiving a frame. The acknowledgements are responsive to the frame, but may be acknowledging receipt of data from that frame or a previous frame, and may be repeating previously transmitted acknowledgements. The window may begin with a "gap" of some amount of time during which the medium is to be idle. Such MAC layer acknowledgements are used to detect failure to decode a message at a receiver. Re-transmission can then be used to recover from the failure. Receive failure can occur due to transmit collisions (two stations contending for network access to transmit at the same time) or because of poor channels (noise and multipath) and changing channel characteristics. In some cases, it is beneficial to use immediate acknowledgement schemes. For example, under certain conditions, wireless networks and power line networks may be more susceptible to failures in receiving frames and so these types of networks typically utilize immediate acknowledgements.

MAC layer acknowledgements commonly used include a simple acknowledgement ("ACK"), a simple negative acknowledgement (NACK), and/or a selective or block acknowledgement (SACK). ACKs are typically sent by the receiver of a unicast frame whenever the frame is successfully received and decoded. NACKs are sent by the receiver of a unicast frame whenever the receiver detects the frame but on decoding the frame finds that there are errors in the data. The absence of an expected ACK is often interpreted as a NACK. In some implementations, the sender may request the receiver to retransmit an acknowledgement it expected but did not receive correctly in order to avoid unnecessary retransmission of data. A SACK is used to improve network throughput and efficiency. For example, a station (sender) sending data to a second station (receiver) organizes the data into blocks of data that may be identified by sequence numbers. The blocks may be sent in a single frame or multiple frames. The receiver uses a selective or block acknowledgement (SACK) to indicate which blocks of data were received correctly and which blocks of data had error thus and were not received correctly. The blocks may be identified through sequence numbers or by their position in the frame(s) in which they were sent. In some implementations, the sender then re-transmits only those data blocks that had error.

Data transmitted over a network is typically structured into frames. In some implementations, frames typically have three major parts; a preamble, a header, and a data payload. For example, the preamble is transmitted first and allows the receiver to detect the start of frames. In some implementations, preambles are also used to perform channel estimation. The header may be transmitted next and may contain control information such as the type of frame, if a payload is attached, the destination address and the address of the transmitter. The payload typically contains a set of cyclic redundancy check (CRC) bits that allow the receiver to determine if the data payload was decoded correctly.

In some cases, a simple frame exchange acknowledgement scheme is used, in which a unicast address frame with data payload is sent from one station (sender) to a second station (receiver), and the receiver station acknowledges the data frame with an ACK frame. The data frame contains a preamble, a header, and a data payload. The ACK frame contains a preamble and header but no data payload. In some implementations, one or more fields in the ACK header identify the frame as an acknowledgement frame. In this example, the ACK immediately follows the data frame after a short inter-frame gap (IFG) and no other stations are able to transmit on the network. Therefore, the ACK frame, if sent, is transmitted contention-free.

In some cases, a selective or block acknowledgement (SACK) can also be used. In such cases, the sender organizes the data into blocks which are transmitted in multiple frames. A field in the header of the frames indicates if the receiver is to respond with a selective acknowledgement. The transmitter may send several frames and in the last frame indicate that a selective acknowledgement response is requested. At this point, the receiver responds with a selective ACK frame which indicates which data blocks were sent correctly and which were in error. In some cases, the selective ACK includes a data payload. In some implementations, the data which indicates which frames were correctly received and which are in error is sent as a part of this data payload. In other implementations, the selective acknowledgement data may be sent as a part of the header.

In some implementations, multicast or broadcast frames are sent over commercially available LAN systems with no acknowledgement, or with a partial acknowledgement scheme in which only one intended receiver may respond with an acknowledgement.

In some implementations, a station with data that are to be delivered to multiple receivers on a shared medium network transmits the data in one or more frames with a broadcast or multicast destination address in the frame header. Control information in the transmitted frame header may indicate if the intended receivers are to respond with acknowledgements according to the methods and systems described herein. In some implementations, receivers of the multicast or broadcast frame may transmit acknowledgements during regular, recurring non-overlapping periods of times referred to as "slots" that immediately follow the broadcast or multicast frame. The slots may be sequentially numbered, with the slot occurring earliest in time numbered 1, the next in time numbered 2, and so on. There may be a short inter-frame gap (IFG) period between the multicast or broadcast frame and the first slot, and optionally between all slots. The ending of the multicast or broadcast message is used to determine the start and ending point in time for each of the slots.

In some implementations, the number of slots available for transmitting acknowledgements is established by the transmitter of the multicast and broadcast frames. In other implementations, the number of slots available for transmitting acknowledgements is established by any other node of the network. Information in the multicast or broadcast frame header may indicate the total period of time immediately after each multicast or broadcast frame that is available for transmitting acknowledgements. In some implementations, information on the total period of time immediately after each multicast or broadcast frame that is available for transmitting acknowledgements is transmitted by one or more management messages transmitted to all the receivers. All stations in the network decode the information in the multicast and broadcast frame header and/or management messages and use this information to deter from transmitting, except for acknowledgements responsive to at least a part of the multicast or broadcast frame, until the end of the period of time reserved for acknowledgements. Therefore, in such implementations, the acknowledgements are transmitted contention-free.

The total period of time immediately following each multicast or broadcast frame reserved for transmitting acknowledgements may be indicated by a field that contains the number of acknowledgement slots. In some implementations, the duration of the acknowledgement slots and the IFG are known to the stations in the network and are used to calculate the total duration of the period of time reserved for transmitting acknowledgements. Alternatively, a field indicates the duration of the time reserved for transmitting acknowledgements, or the total time of the frame exchange sequence (that is, the duration of the multicast or broadcast frame plus the time reserved for transmitting acknowledgements), or the total time of the frame exchange sequence minus the duration of one slot and one IFG. The latter is useful for compatibility with transmissions of unicast frames immediately acknowledged in which the duration field indicates the time to transmit the frame. The field that contains the number of acknowledgement slots can be included in the header of the frame immediately preceding the acknowledgement window, or in the header of a previous frame, or in a management message sent before the sender station started the multicast or broadcast transmissions.

In some implementations, the transmitter of the multicast or broadcast frames may use the indication of the duration of the time reserved for transmitting acknowledgements to modify the intended recipients. For example, a subset of the stations previously assigned a slot as an intended recipient (e.g., using management messages) transmit acknowledgements in their assigned slots and some of the stations are removed as intended recipients and therefore should no longer transmit acknowledgements. In such cases, stations that otherwise would transmit an acknowledgement do not transmit an acknowledgement if the slot that would have been used for transmitting the acknowledgement occurs later in time than the modified (e.g., shortened) time reserved for transmitting acknowledgements.

In some implementations, some intended recipients of the multicast or broadcast messages are not requested to respond with an acknowledgement. This may be useful when there are some stations for which ensuring successful delivery of the multicast or broadcast messages is not critical or for which delivery is almost certain, especially when compared to other stations that are requested to respond.

In some implementations, the transmitter of the broadcast or multicast frames may, after sending one or more frames containing data, send an acknowledgement request frame consisting of a preamble and header only. The intended recipients of the broadcast or multicast frames respond to the acknowledgement request by acknowledging the most recently transmitted frame or frames according to the type of acknowledgement being used (simple or selective) as described below.

In some implementations, each station that responds to a broadcast or multicast frame is assigned a unique slot for transmitting the acknowledgements. In one such implementation, the acknowledgements are sent after every multicast or broadcast frame or data packet and the acknowledgements indicate success or failure to receive and/or decode the immediately preceding frame or data packet. Positive acknowledgements may be used to indicate that the preceding frame was received and decoded successfully. Negative acknowledgements may be used to indicate that the preceding frame was received or detected, but not successfully decoded. In some cases, no response in an acknowledgement slot indicates to the transmitter that the receiver did not detect the frame and that re-transmission is required. In some implementations, only positive acknowledgements may be used. In some implementations, a receiver may be assigned a single time slot to transmit a positive or negative acknowledgement. In other implementations, a receiver may be assigned separate slots for transmitting a positive acknowledgement and a negative acknowledgement. In some implementations, a group of receivers may be assigned the same slot in which to transmit a positive or negative acknowledgement. In some implementations, ACK and/or NACK slots may be associated with blocks of data.

The acknowledgements may be of various forms. In some implementations, the acknowledgements may include a preamble and a header, or simply a preamble pattern. In the case of the preamble and header, information in the header may indicate whether the acknowledgement is a positive or a negative acknowledgement. In some implementations, the header may indicate other information, such as the address of the station transmitting the acknowledgement. In the case of a preamble pattern, two distinct preamble patterns may be used to indicate positive and negative acknowledgements respectively.

Figure 3:
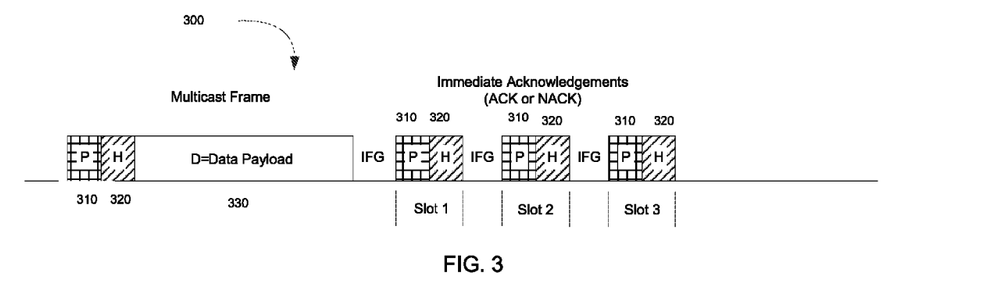
FIG. 3 is an example of an acknowledgement scheme for multicast transmissions.
Figure 4:
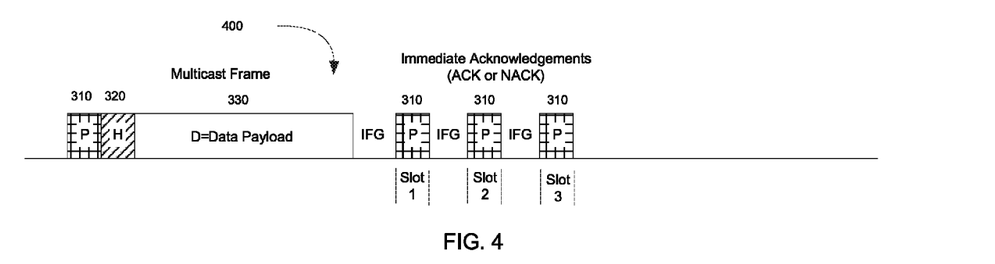
FIG. 4 is another example of an acknowledgement scheme for multicast transmissions.

Referring now to FIG. 3, an example of an acknowledgement scheme 300 for multicast transmissions is shown and described. In the example shown in FIG. 3, the acknowledgements include a preamble 310 and a header 320. FIG. 4 depicts the example of an acknowledgement scheme 400 for multicast transmissions in which acknowledgements consist of a preamble pattern only. In this example, the preamble pattern 310 may be different from other preamble patterns used at the beginning of frames that include additional information. When the preamble pattern 310 is sent alone, there may not be any need to provide timing information used to detect the start of a frame. For example, preamble pattern 310 sent alone could include a sequence of X identical OFDM symbols; whereas a preamble pattern 310 sent before a header 320 could include a sequence of Y identical OFDM symbols followed by Z OFDM symbols having inverted polarity (i.e., same time domain waveform but opposite sign).

Figure 5:
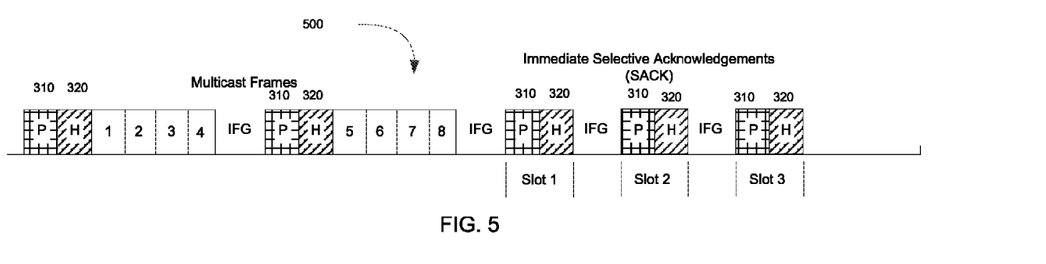
FIG. 5 is still another example of an acknowledgement scheme for multicast transmissions.

Referring now to FIG. 5, an example of an acknowledgement scheme 500 for multicast transmissions using selective acknowledgements is shown. In this example, a selective or block acknowledgement scheme is used. In such an implementation, the transmitter sends the data in data blocks using one or more frames. Intended recipients transmit selective acknowledgements which indicate which blocks of data in the preceding frame or frames were successfully received and/or decoded and which were not successfully received and/or decoded. The transmitter re-transmits only those blocks of data that were not successfully decoded by one or more intended recipients. In some implementations, information in the multicast or broadcast frame header 320 indicates if the intended recipients are to respond with acknowledgements. The information indicating which blocks were or were not successfully received and/or decoded may be sent in a data payload portion of the acknowledgement frame. In some cases, this information may be indicated in a header portion 320 of the acknowledgement frame. In the example shown in FIG. 3, the selective acknowledgement is sent in the data payload portion 330 of the acknowledgement frame.

In some implementations, the slots to be used for transmitting acknowledgements are assigned by the transmitter of the multicast or broadcast frames. Management messages sent by the transmitter or any other node in the network may be used to assign the slots, and the slot assignment may be updated as required, as stations join or leave the network or as stations join or leave the multicast group. In some implementations, information in the header 320 of the multicast or broadcast frame may be use to indicate which station is to respond in each acknowledgement slot.

In implementations where management messages are used to assign slots, additional information may be included in the header 320 to selectively limit the set of stations that may respond. For example, a field in the header 320 may be used to indicate that the first slot in time after the multicast or broadcast frame is not the first slot in acknowledgement order, but a higher numbered slot. In this case, stations assigned to slots with numbers less than the indicated slot number do not respond with acknowledgements, as limited by the amount of time or the number of acknowledgement slots available in the acknowledgement period. In another example, a bit vector can be used to indicate which stations are to respond according to their slot assignments. In this case, each station is able to determine when the assigned slot in which it is to transmit an acknowledgement is to begin by accounting for the number of slots before its assigned slot and assuming a known duration for all slots in which a response is requested and a zero duration for all slots in which a response is not requested. In yet another example, a field in the header 320 may be used to indicate the number of slots in the acknowledgement window. In this case, stations assigned to slots beyond the specified number of slots refrain from transmitting acknowledgements.

In some implementations, the set of receivers for which the multicast transmissions are intended can change with time. For example, when the multicast transmission is a video stream intended for multiple display devices (e.g., television, computers), the number of display devices can vary with time as users turn on/off their respective display devices. In such cases, the slot assignment for the receiver acknowledgements has to be changed. In some implementations, this is accomplished by using management messages that update the slot assignment. These management messages may include information on when the transition to the new slot assignment will become effective. For example, the management messages may include the time after which the new slot assignment will become effective. In some implementations, the control information in the header 320 is used to indicate the slot assignment rule to be used.

Figure 6:
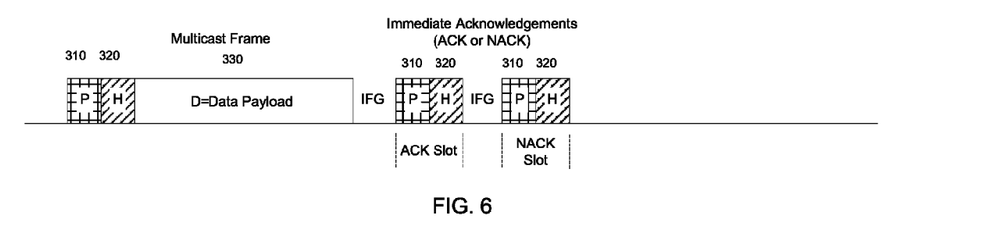
FIG. 6 is yet another example of an acknowledgement scheme for multicast transmissions.

Referring now to FIG. 6, another example of an acknowledgement scheme 600 for multicast transmissions is shown and described. In this example, a pair of slots is used to transmit positive and negative acknowledgements, respectively. In some implementations, more than one pair of slots may be used to transmit the positive and negative acknowledgements. The first slot in a pair of slots is used for positive acknowledgements and the second slot in a pair is used for negative acknowledgements. Positive acknowledgements may be sent using either a preamble pattern 310 only or a preamble 310 and a header 320. Negative acknowledgements are sent using both a preamble 310 and a header 320. In some implementations, multiple stations may transmit acknowledgements in a same acknowledgement slot. In such cases, when two or more stations transmit acknowledgements in the same slot, the preamble patterns 310 constructively interfere, allowing the transmitter of the multicast or broadcast message to reliably detect the preamble pattern 310.

When most multicast or broadcast frames are successfully decoded by the intended receivers, collisions of negative acknowledgements will be infrequent. In such cases, the header 320 of a negative acknowledgement will be successfully decoded, allowing the transmitter to know which station was not able to successfully decode the multicast or broadcast frame. If repeated failures occur with the same station, the transmitter may take action such as re-assessing the channel characteristics of the channel between the sender and the failing station. The transmitter may adjust one or more parameters of the transmission accordingly. For example, the transmitter may adjust an encoding used to transmit the multicast or broadcast frames.

Figure 7:
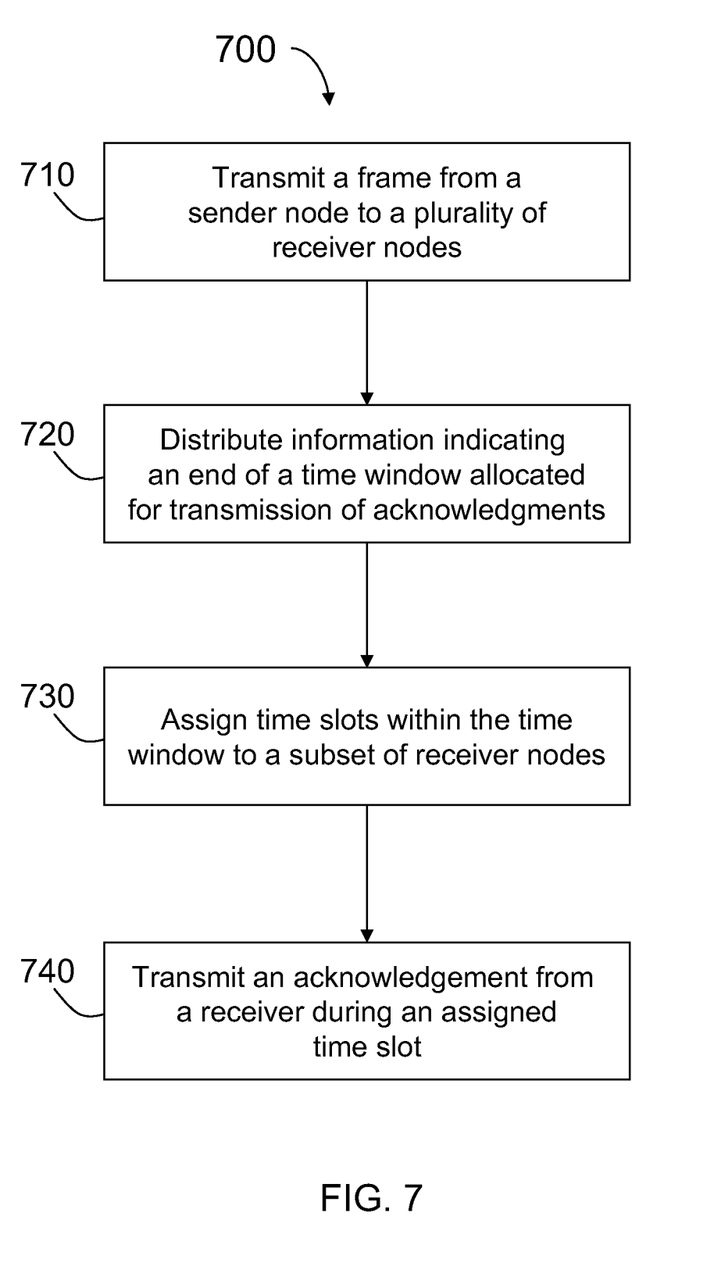
FIG. 7 is a flowchart representing exemplary operations in managing transmissions among nodes in a network.

When multiple pairs of slots are used for acknowledgement responses, management messages or information in the header 320 of the multicast or broadcast frame can be used by the transmitter to assign which pair of acknowledgement slots is to be used by each station transmitting an acknowledgement. Referring now to FIG. 7, a flowchart 700 represents a particular arrangement of operations for managing transmissions among nodes in a network. Typically the operations are carried out on one or more computing devices at the nodes of the network. In some implementations, one or more of these operations may be executed on processors present in these devices.

Operations may include transmitting (step 710) a frame from a sender node to a plurality of receiver nodes. In some implementations, the could be a broadcast frame meant for all the receivers connected to the network. In some implementations, the frame could be a multicast frame intended for the plurality of receivers and not for other nodes in the network.

Operations may include distributing (step 720) information indicating an end of a time window allocated for transmission of acknowledgements. In some implementations, such information is distributed as a part of a management information transmitted from a sender node to the plurality of receiver nodes in the network. Such management information may be distributed prior to the transmission of a frame between the sender and the plurality of receivers. In some implementations, the management information is distributed via a transmission from one node (for example, the sender node) to other nodes (for example, the plurality of the receiver nodes) in the network. In some implementations, the management information is distributed by pre-programming the information in nodes such as the plurality of receiver nodes. In some implementations, at least a part of such management information may be included as control information, such as in a header 320, of a frame transmitted from a sender to the plurality of receiver nodes. In some implementations, information indicating the end of the time window may be specified explicitly. In other implementations, such information may be derived from other information such as a number of slots within the time window and a length of each slot.

Operations may also include assigning (step 730) time slots within the time window to a subset of receiver nodes for transmitting acknowledgement messages. In some implementations, some receiver nodes of the plurality of receiver nodes are assigned time slots while other receiver nodes are not assigned any time slots. In some implementations each subset of receiver nodes may include only a single receiver node and each receiver node may be assigned a unique time slot.

Operations may further include transmitting (step 740) an acknowledgement from a receiver to a sender during an assigned time slot. Transmitting an acknowledgement may include transmitting a positive acknowledgement responsive to successfully receiving at least a part of a frame from the sender. Transmitting an acknowledgement may also include transmitting a negative acknowledgement responsive to not receiving at least a part of a frame from the sender. Transmitting an acknowledgement may be responsive to receiving each frame from the sender or could also be responsive to receiving a group of frames. In some implementation, transmitting an acknowledgement by a receiver is responsive to at least a part of a received frame that indicates that the sender has requested an acknowledgement. The acknowledgement is transmitted by a receiver in the slot within the time window that is assigned to the receiver.

Figure 8:
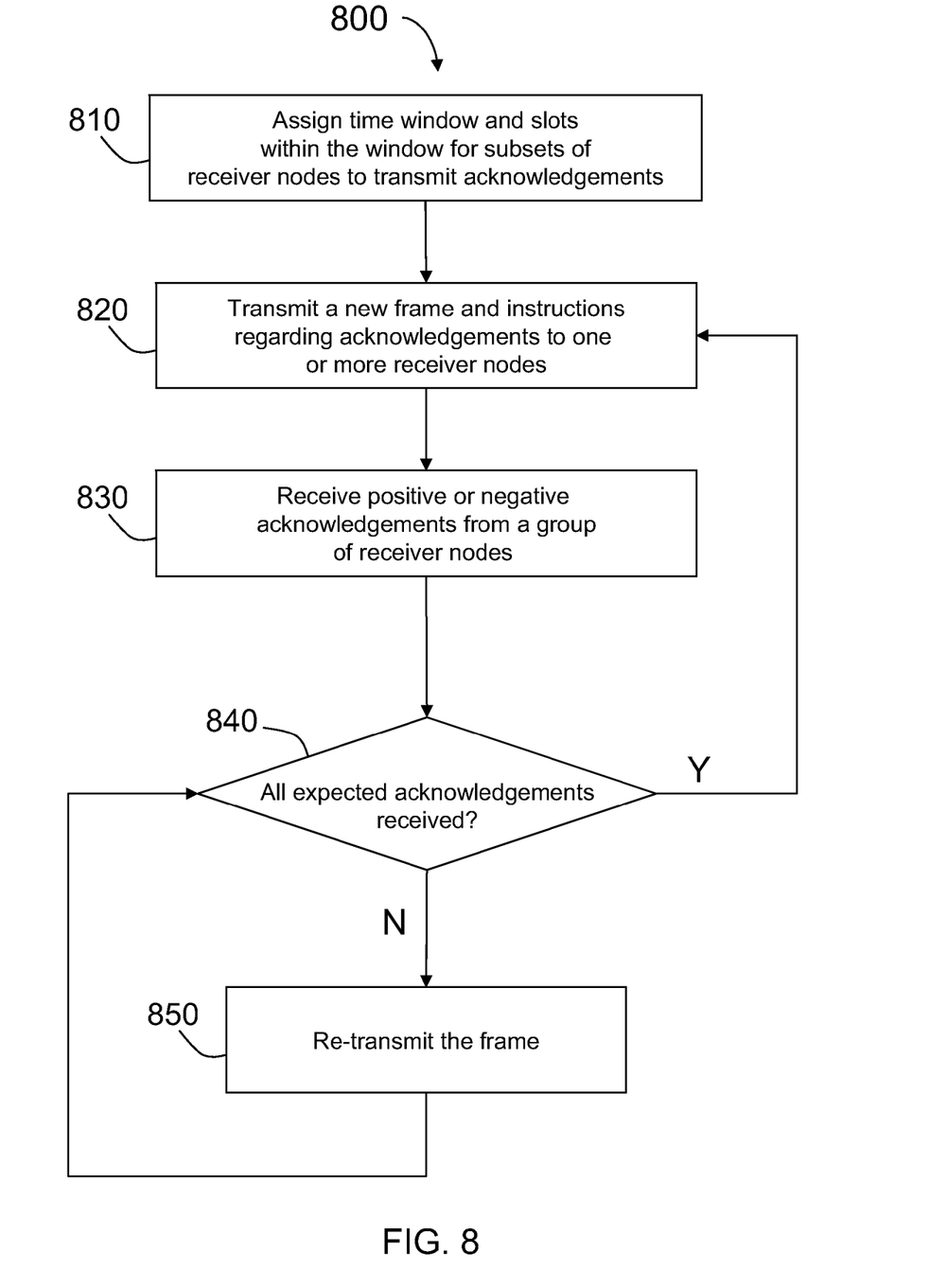
FIG. 8 is a flowchart representing exemplary operations at a sender node in managing transmissions from the sender node.

Referring now to FIG. 8, a flowchart 800 represents exemplary operations at a sender node to manage transmissions from the sender node. Typically the operations are carried out on one or more computing devices. Operations may include assigning (step 810) a time window and assigning slots within the time window for subsets of receiver nodes to transmit their acknowledgements. Operations may further include transmitting (step 820), to one or more receiver nodes, a new frame of data and instructions regarding acknowledgements. For example, the instructions regarding acknowledgements may include instructions for a particular receiver or groups of receivers to send acknowledgements. Such instructions may include instructions for a receiver or a group of receivers not to send their acknowledgements. In some implementations, such instructions are provided to the one or more receivers via a payload portion or via an control portion, such as a header 320, of a frame of data. In some implementations, the sender node maintains a list of receivers that are expected to send acknowledgements responsive to a data packet or a group of data packets.

Operations may include receiving (step 830) positive or negative acknowledgements from a group of receiver nodes. In some implementations, the sender node checks the validity of the acknowledgement by verifying which time slot it has been received in. Operations may further include tracking (step 840) whether all expected acknowledgements have been received. When all expected acknowledgements are received, the sender may transmit (step 820) one or more new frames to the group of receivers. In some implementations, the sender further checks whether any of the received acknowledgements are negative acknowledgements. When all expected acknowledgements are not received or if at least one of the received acknowledgements is a negative acknowledgement, operations may include re-transmitting (step 850) the frame accordingly. In some implementations, the sender starts transmitting a new frame after the retransmission. In other implementations, the sender further checks whether all expected acknowledgements have been received before transmitting a new frame.

Figure 9:
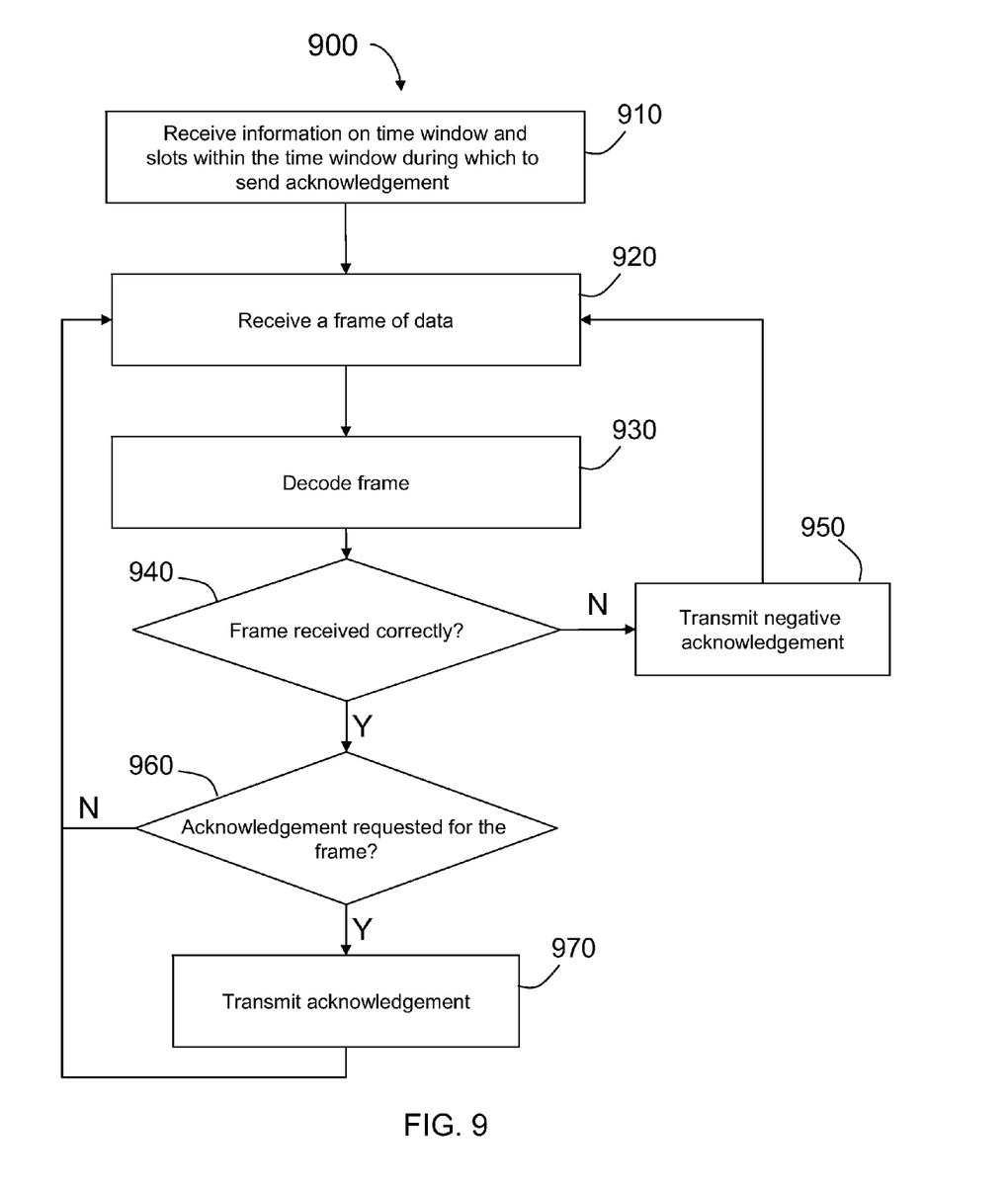
FIG. 9 is a flowchart representing exemplary operations at a receiver node in managing acknowledgements to a sender node.

Referring now to FIG. 9, a flowchart 900 represents exemplary operations at a receiver node to manage acknowledgements to the sender node. Typically the operations are carried out on one or more computing devices. Operations may include receiving (step 910) information on a time window and one or more slots within the time window when the receiver can send an acknowledgement. Such information may be received from the sender or any other node in the network controlling the transmissions between the sender and the receiver. Operations also include receiving (step 920) a frame of data and decoding the frame of data. Decoding (step 930) the frame may include synchronization, identification of one or more of a payload and control information and checking for errors.

Operations further include determining (step 940) whether the frame has been received correctly. In some cases, the control information, such as a part of a header, 320 may be received correctly but the payload may not be received correctly. In other cases the entire frame may be lost or corrupted. If it is determined that the frame has not been received correctly, the receiver may transmit (step 950) a negative acknowledgement to the sender. In some implementations, the negative acknowledgement is transmitted in a slot assigned to the receiver. The assigned slot may be assigned for any acknowledgements or in some implementations may be assigned exclusively for negative acknowledgements. The receiver may proceed to receive a next frame of data on sending the negative acknowledgement.

If the frame is determined to have been received correctly, operations may further include checking (step 960) if the sender has requested for an acknowledgement. In some implementations, this is done by checking a field in an control or payload portion of the frame. If no acknowledgement has been requested, the receiver may proceed to receive (step 920) the next frame of data.

If an acknowledgement has been requested, operations further include transmitting (step 970) an acknowledgement to the sender that the frame has been received. In some implementations, such a positive acknowledgement may also include further information such as identification of the frame and the receiver as a part of the acknowledgement message. The acknowledgement message may include a preamble and control information.

Many other implementations of the invention other than those described above are within the invention, which is defined by the following claims.

What is claimed is:

1. A method for managing transmissions among nodes communicating over a shared communication medium, the method comprising:
    transmitting a frame from a sender node to a plurality of receiver nodes, the frame including at least a portion of a data packet and control information associated with accessing the communication medium;
    defining a time window commencing after the data packet of the transmitted frame, the time window allocating a time period for receiving two or more acknowledgement signals, wherein the time window includes two or more time slots, a first time slot within the time window separated from the data packet by an inter-frame gap period and each time slot separated from other time slots by the inter-frame gap period;
    assigning each time slot in the time window to one or more receiver nodes from the plurality of receiver nodes; and
    receiving an acknowledgement signal from the one or more receiver nodes during the time slot assigned to the one or more receiver nodes, wherein the acknowledgement signal is responsive to the transmitted frame.

2. The method of claim 1, wherein the acknowledgement signal comprises one of a positive acknowledgement responsive to successfully receiving the portion of the data packet and a negative acknowledgement responsive to not successfully receiving at least a part of the portion of the data packet.

3. The method of claim 1, wherein the acknowledgement signal comprises a preamble for detecting a start of the frame over the communication medium and control information.

4. The method of claim 1, wherein the control information includes
    information indicating that the one or more receiver nodes are not to transmit an acknowledgement signal to the sender node after receiving the transmitted frame.

5. The method of claim 1, wherein the control information includes information indicating a time window duration, wherein the time window duration comprises a time period relative to a predetermined portion of the frame.

6. The method of claim 1, wherein information related to time window duration is distributed prior to transmission of the frame.

7. The method of claim 1, wherein the assigning is performed by the sender node.

8. The method of claim 1, wherein the assigning includes one of:
    transmitting one or more management messages from the sender node to the plurality of receiver nodes, and
    transmitting assignments of the time slots in the control information.

9. The method of claim 1, wherein the assigning is performed prior to the transmission of the frame.

10. The method of claim 1, wherein the time window follows transmission of each of multiple consecutive frames from the sender node.

11. The method of claim 1, further comprising, prior to transmission of the frame, determining transmission parameters for the frame based on one or more channel characteristics of channels from the sender node to each of the plurality of the receiver nodes.

12. The method of claim 1, wherein a duration of the time window is based, at least in part, on information in a header of the transmitted frame.

13. The method of claim 1, further comprising detecting one or more receiver nodes that are no longer sharing the communication medium.

14. The method of claim 1, further comprising detecting, by the sender node, that one or more channel conditions from the sender node to one or more of the receiver nodes have changed and adjusting one or more transmission parameters of subsequent frames from the sender node to the one or more receiver nodes to account for changes in the one or more channel conditions.

15. The method of claim 1, wherein one or more of the plurality of receiver nodes are included in a subset of the receiver nodes and are assigned a time slot for transmission of an acknowledgement signal to the sender node.

16. The method of claim 1, wherein the control information includes information indicating a number of frames that will precede the time window.

17. The method of claim 2, wherein the negative acknowledgement is responsive to successfully receiving at least part of the transmitted frame and not successfully receiving at least part of the portion of the data packet.

18. The method of claim 2, wherein the negative acknowledgement includes not receiving a positive acknowledgement during the time slot assigned to the one or more receiver nodes.

19. The method of claim 3, wherein the control information indicates whether the acknowledgement signal corresponds to a positive acknowledgement or a negative acknowledgement.

20. The method of claim 4, wherein the information indicating that the one or more receiver nodes are not to transmit an acknowledgement signal further includes information to remove the time slot from the time window associated with the one or more receiver nodes.

21. The method of claim 4, wherein the information indicating that the one or more receiver nodes are not to transmit an acknowledgement signal includes a bit vector, with each bit in the bit vector associated with a single receiver node and each bit indicating if the receiver node associated with the bit is to not transmit an acknowledgement signal to the sender node during a time slot previously assigned to the receiver node.

22. The method of claim 4, wherein the information indicating that the one or more receiver nodes are not to transmit an acknowledgement signal includes a field indicating when a designated set of one or more receiver nodes are to not transmit acknowledgement signals during time slots previously assigned to the one or more receiver nodes.

23. The method of claim 4, wherein the information indicating that the one or more receiver nodes are not to transmit an acknowledgement signal includes a field indicating that a receiver node with a time slot assignment in an indicated range of time slots is not to transmit an acknowledgement signal.

24. The method of claim 5, wherein one or more nodes coupled to the communication medium other than the sender node or the one or more receiver nodes transmits a second frame after the time window.

25. The method of claim 6, wherein the information related to time window duration comprises a number and length of time slots in the time window.

26. The method of claim 11, wherein the determining the transmission parameters based on the one or more channel characteristics includes estimating signal-to-noise ratios associated with the plurality of receiver nodes.

27. The method of claim 24, wherein the one or more nodes other than the sender node or the one or more receiver nodes contend for use of the communication medium after the time window and before transmitting the second frame.

28. A system, comprising:
a sender node, communicating with two or more receiver nodes in a network, the sender node configured to:
transmit a frame to the two or more receiver nodes in the network, the frame including at least a portion of a data packet and control information associated with accessing a communication medium;
define a time window commencing after the data packet of the transmitted frame, the time window allocating a time period for receiving two or more acknowledgement signals, wherein the time window includes two or more time slots, a first time slot within the time window separated from the data packet by an inter-frame gap period and each time slot separated from other time slots by the inter-frame gap period;
assign each time slot in the time window to one or more receiver nodes in the network; and
receive an acknowledgement signal from the one or more receiver nodes in the network during the time slot assigned to the one or more receiver nodes, wherein the acknowledgement signal is responsive to the transmitted frame.

29. A communication node, comprising:
a network interface coupled to a shared communication medium, the network interface configured to transmit and receive data through the shared communication medium;
a transmitter coupled to the network interface, the transmitter configured to:
transmit a frame of data, the frame including at least a portion of a data packet and control information associated with accessing the shared communication medium, and
define a time window commencing after the data packet, the time window allocating a time period for receiving two or more acknowledgement signals from a plurality of communication nodes coupled to the shared communication medium, wherein the time window includes two or more time slots, a first time slot within the time window separated from the data packet by an inter-frame gap period and each time slot separated from other time slots by the inter-frame gap period; and
a receiver coupled to the network interface, the receiver configured to receive data transmitted from the plurality of communication nodes.

30. The communication node of claim 29, wherein the transmitter is further configured to assign each time slot in the time window to one or more of the plurality of communication nodes coupled to the shared communication medium.

31. The communication node of claim 29, wherein the control information includes information indicating that at least one of the plurality of communication nodes is not to transmit an acknowledgement signal to the communication node responsive to the transmitted frame.

32. The communication node of claim 29, wherein information related to time window duration is distributed prior to transmission of the frame.

33. The communication node of claim 29, wherein one of the plurality of communication nodes is not assigned a time slot for transmission of an acknowledgement signal.

34. The communication node of claim 29, wherein a duration of the time window is based, at least in part, on information in a header of the transmitted frame.

35. The communication node of claim 30, wherein the receiver is further configured to receive two or more acknowledgement signals from the plurality of communication nodes coupled to the shared communication medium, wherein the two or more acknowledgement signals are responsive to the transmitted frame.

36. The communication node of claim 30, wherein the assigning includes transmitting assignments of time slots in the control information.

37. The communication node of claim 30, wherein the assigning is performed prior to the transmission of the frame.

38. The communication node of claim 31, wherein the control information includes information to remove the time slot from the time window associated with the at least one the plurality of communication nodes.

39. The communication node of claim 31, wherein the control information includes a field indicating that a communication node with a time slot assignment in an indicated range of time slots is not to transmit an acknowledgement signal.

40. The communication node of claim 32, wherein the information related to the time window duration comprises a number and length of time slots in the time window.

41. The communication node of claim 35, wherein a first acknowledgement signal in the first time slot corresponds to a first communication node and a second acknowledgement signal in a second time slot corresponds to a second communication node.

42. The communication node of claim 35, wherein at least one of the acknowledgement signals includes a negative acknowledgement responsive to not successfully receiving at least part of the transmitted frame.

43. The communication node of claim 35, wherein at least one of the acknowledgement signals comprises a preamble for detecting a start of a frame transmitted through the shared communication medium.

44. The communication node of claim 42, wherein the negative acknowledgement includes not receiving a positive acknowledgement.

45. The communication node of claim 43, wherein the control information indicates whether at least one of the acknowledgement signals corresponds to a positive acknowledgement or a negative acknowledgment.

* * * * *